United States Patent Office 2,774,798
Patented Dec. 18, 1956

2,774,798

PROCESS FOR DEHALOGENATION OF ORGANIC COMPOUNDS IN THE PRESENCE OF A DETERGENT

Horace R. Davis, Cedar Grove, and Stanley Hsi Kwei Chiang, Jersey City, N. J., assignors to The M. W. Kellogg Company, Jersey City, N. J., a corporation of Delaware No Drawing. Application November 23, 1954,
Serial No. 470,809

18 Claims. (Cl. 260—653)

This invention relates to the dehalogenation of a halogen-containing compound. In one of its aspects this invention relates to a process for selectively dehalogenating halogenated organic compounds. In another of its aspects this invention relates to a process for preparing fluorine-containing olefins. This invention has as one of its more particular aspects the preparation of tetrafluoroethylene, trifluorochloroethylene, 1,1-difluoro-2-chloroethylene, vinylidene fluoride and other valuable intermediates from appropriate halogen-containing aliphatics.

Intermediate compounds of significant industrial importance are prepared by dehalogenation reactions. For example, polymers of trifluorochloroethylene are prepared by polymerizing monomeric trifluorochloroethylene which is usually obtained by the dechlorination of trifluorotrichloroethane.

Several techniques for dehalogenating these halogen-containing compounds have been proposed. One technique uses methyl alcohol and a metal dehalogenating agent, e. g., zinc. This technique results in relatively high yields of desired product with a minimum of undesirable side products. However, recovery of alcohol is so expensive that the alcohol is usually discarded. Aqueous techniques have also been proposed. In these aqueous techniques a metal dehalogenating agent is employed, usually zinc together with some initiator, such as zinc chloride, stannous chloride, etc. While these aqueous techniques result in rather good yields of desired product, the yields of undesirable side products are so high that the process is not considered commercially feasible. Additionally, in these aqueous systems, the temperature required to carry out the reaction is quite high. Thus, despite the high cost of alcohol, the alcohol dehalogenation technique is the most widely used for the production of trifluorochloroethylene.

Monomers suitable for the preparation of a variety of polymers are prepared by other techniques. For example, tetrafluoroethylene, and vinylidene fluoride are usually prepared by pyrolysis. The use of pyrolytic techniques with its numerous and obvious disadvantages, is necessitated by the inability to obtain relatively good selectivity to principal product by other processes.

It is an object of this invention to provide an aqueous dehalogenation process with good selectivity.

Another object of this invention is to provide a method for dehalogenating halogen-containing organic compounds which can be easily controlled and which is highly selective.

It is another object of this invention to provide a process for preparing fluorine-containing olefinic monomers from the corresponding fluorochloro alkanes.

It is one of the more particular objects of this invention to provide a process for the dechlorination of 1,1,2-trifluorotrichloroethane to produce trifluorochloroethylene, for the dechlorination of 1,2-dichlorotetrafluoroethane to produce tetrafluoroethylene, for the dechlorination of 1,2-dichloro-1,1-difluoroethane to produce vinylidene fluoride, and the defluorochlorination of 1,1,1-trifluorodichloroethane to produce 1,1-difluoro-2-chloroethylene and to conduct each of the above described reactions with a minimum production of side products.

Various other objects and advantages of the present invention will become apparent to those skilled in the art from the accompanying description and disclosure.

The above objects are accomplished by reacting the starting material, i. e., a halogen-containing organic compound containing at least one halogen atom on each of two adjacent carbon atoms at least one of said halogen atoms being a halogen other than fluorine, in aqueous phase with a metal dehalogenating agent and a quantity of a detergent at a temperature between about 0° C. and about 100° C. and at substantially autogenous pressures. The halogen-containing organic compound preferably contains fluorine or chlorine on one carbon atom and chlorine on an adjacent carbon atom. For reasons which will be apparent hereinbelow, the detergent is one which does not react with the metal dehalogenating agent to form a water insoluble compound.

As indicated previously, the starting materials which are dehalogenated by the process of this invention, are those compounds which contain at least one halogen atom on two adjacent carbon atoms at least one of said halogen atoms being a halogen other than fluorine. The adjacent carbon atoms can be additionally bonded to alkyl, aryl, halogen or hydrogen substituents. In the case of straight chain compounds, preferably not more than 6 carbon atoms constitute the chain. The starting compounds can be unsaturated provided that no unsaturation is present between the adjacent carbon atoms which contain the removable halogens. This invention is particularly suited to the dehalogenation of fluorochloroalkanes which contain either fluorine or chlorine on a carbon atom and chlorine on an adjacent carbon atom. Preferred starting compounds are those which contain 2 to 3 carbon atoms. This invention particularly contemplates the dechlorination of 1,2-dichlorotetrafluoroethane, 1,1,2-trifluorotrichloroethane and 1,2-dichloro-1,1-difluoroethane and the defluorochlorination of 1,1,1-trifluorodichloroethane.

The metal dehalogenating agents which are used in the process of this invention are tin, magnesium, iron, zinc and aluminum. Zinc is the preferred halogenating agent.

As indicated previously, detergents which do not react with the metal dehalogenating agent to form a water insoluble compound are employed in the process of this invention. These detergents fall into three classes namely, non-ionic, anionic and cationic. All are commercially available and some are distributed under trade names which, for convenience, are given in parentheses. Representative of the non-ionic detergents are: polyglycol ether stearate (All), dimethyl octynediol, pentaerythritol monostearate (Pentamul 6), pentaerythritol monolaurate (Pentamul 147), diethylene glycol monooleate (diglycol oleate A1418F), 2-amino-2-ethyl-1,3-propanediol monostearate, mono-, di-, and triethanolamine oleate, sorbitol monoether of 2-hydroxy-5-hexyl-benzyl alcohol, tertiary octyl-$\beta$-hydroxyethyl sulfone $$(C_8H_{17}-SO_2-C_2H_4OH-Ciba)$$

ethylene oxide etherified products of the lauric, palmitic, oleic and stearic acids of anhydrosorbitols (Tweens 40, 60, 61, 80, 81 and 85), sorbitan monolaurate (Span 20) sorbitan monopalmitate (Span 40), sorbitan trioleate (Span 85), diethylene glycol monolaurate (Glaurin), the Ninols, i. e., the condensation product obtained by heating a higher fatty acid with diethanolamine in approximately 1:2 mol ratio and Victawet 12, an ester of phosphoric acid in which one of the hydrogen atoms is esterified with polyethylene glycol and the other two hydrogens are esterified with a hydrophobic alcohol of medium chain length. Representative of the cationic detergents are: stearyl dimethyl benzyl ammonium chloride, cetyl trimethyl ammonium chloride (Cetavlon), cetyl pyridinium bromide, stearamidomethylene pyridinium chloride (Zelan), ethylenelaurate pyridinium bromide, cetyl methyl piperidinium chloride, cetyl dimethyl-o-chlorobenzyl ammonium bromide, stearyl diethyl cyclohexyl ammonium chloride, N-oleoyl-2,2-N'-diethyl ethylene diamine hydrochloride (Sapamines), N - octadecyloxymethylene pyridinium chloride (Velan), and N-stearoyloxymethylene pyridinium chloride (Norane). Representative of the anionic detergents are: sodium isopropylnaphthalene sulfonate (Aerosol OS), sodium lauryl sulfate, sodium dodecylbenzene sulfonate, sodium ricinoleyl sulfate, sodium dihexyl sulfosuccinate (Aerosol MA), sodium dioctyl sulfosuccinate (Aerosol OT), sodium dibutyl sulfosuccinate (Aerosol IB), sodium keryl benzene sulfonate, β-oleylamido ethane sodium sulfonate (Arctic Syntex T) $C_{17}H_{33}CONHCH_2CH_2SO_3Na$, monolauryl ether of 1,2-dihydroxypropane-3-sodium sulfonate, bis(N-methyl-N-2-ethylhexyl) malamide sodium sulfate, β-oleyl N-methylamido ethane sodium sulfonate (Igepon T), and β-oleyl ethane sodium sulfonate (Igepon A). The above anionic detergents can be used with any of the metal dehalogenating agents. Additional anionic detergents can be employed provided that they do not react with the dehalogenating agent to form a water insoluble compound.

According to the process of this invention the halogen-containing compound which is to be dehalogenated is reacted with the metal dehalogenating agent in the presence of water which contains a quantity of a detergent described above at a temperature between about 0° C. and about 100° C. and at substantially autogenous pressure. The preferred temperature is between about 15° C. and about 90° C. with a particularly suitable temperature between about 25° C. and about 75° C. Temperatures substantially below 0° C., of course, cannot be employed in an aqueous system while temperatures substantially above 100° C. seriously affect the selectivity of the reaction. Operations are preferably conducted at autogenous pressures, although sub-autogenous and super-autogenous pressures can be employed. However, no particular advantage results from the use of other than autogenous pressures. In this connection, it should be noted that while the starting material which is being dehalogenated can be in vapor phase, the water must be in liquid phase.

Water is used in the process of this invention in order to effect temperature control and to act as a solvent for the metal halide which is formed during the reaction. The ratio of water to monomer should never be allowed to go below about 1:5, i. e., at least 20 weight percent of water based on monomer, since, as will become apparent hereinafter in the tables, the presence of large quantities of metal halide seriously affect the selectivity of the system. On the other hand, where water is used in excess any ratio of water to monomer can be employed. However, as a practical matter the ratio of water to monomer should not be allowed to exceed approximately 10:1 since operations become cumbersome and the process becomes uneconomical. Preferably, a water to monomer ratio of from approximately 1:4 to approximately 4:1 is used. Still more preferably, a ratio of between about 1:2 and about 2:1 is employed. In most instances, particularly with respect to the dechlorination of trifluorotrichloroethane a 1:1 ratio will be satisfactory. The concentration of detergent which is employed is between about 0.01 and about 10 percent by weight and usually between about 0.1 and about 5 percent based on water. Preferably, the concentration of detergent is maintained between about 0.1 and about 2 percent by weight based on water since no particular increase in selectivity is obtained using the higher concentrations and since additionally some of the detergents tend to cause frothing or foaming when used in excess.

In the following tables and in the specification terms are used which for purposes of clarity are defined below.

$$\text{Conversion} = \frac{\text{Moles of reactant consumed}}{\text{Moles of reactant charged}}$$

$$\text{Selectivity} = \frac{\text{Moles of desired product formed}}{\text{Moles of reactant consumed}}$$

In order to illustrate the process of this invention, the following tables of data are presented. All runs were made using 1,1,2-trifluorotrichloroethane (Freon 113) of a commercial grade which contained 99.5 percent of 1,1,2-trifluorotrichloroethane and 0.5 percent of 1,1,1-trifluoro-2,2-dichloroethane (Freon 123). The zinc dust which was used was also of commercial quality. With the exception of Table I, all runs were made using tap (city) water. In Table I distilled water was used. No significant difference results from the use of distilled water as compared with tap water. In each of the runs, the technique employed was the same. Thus, the indicated quantity of materials, which incidentally are given in parts by weight, were charged to glass reaction tubes. The tubes were then sealed and maintained at the indicated temperature for the indicated period of time after which they were vented and the contents analyzed using a mass spectrometer.

In Tables I and II the dechlorination of 1,1,2-trifluorotrichloroethane with zinc dust in water at 75° C. and at room temperature (25° C.), respectively, is shown using the detergents of this invention as compared with various prior art additives. From the data of Tables I and II it can be seen that the process of this invention results in higher selectivity with a minimum of undesired side products.

In Table III results from the dechlorination of 1,1,2-trifluorotrichloroethane using the methanol-zinc technique are presented for comparison purposes. It should be noted that the aqueous-detergent dechlorination process is superior to the more costly alcohol dechlorination technique.

In Table IV the effect of temperature and detergent concentration on the rate of reaction and on the selectivity is shown. From this table it can be seen that the aqueous-detergent process of this invention can be used over a relatively wide temperature range without seriously affecting the selectivity of the reaction. For purposes of comparison, runs are included in which a detergent was not used. In each instance, where a detergent was used, the detergent was polyglycol ether stearate (commercially available as All).

In Table V a comparison between non-ionic, cationic and anionic detergents is presented. It should be noted in connection with the use of anionic detergents that those whose metal salts correspond to the metal dehalogenating agent are insoluble in water, are not useful as illustrated by the runs in this table and in the other tables wherein potassium stearate was used. It is believed, in this connection, that the metal halide formed by the reaction of the metal dechlorinating agent reacts with the anionic detergents and if the reaction product is insoluble the detergent is precipitated out of the solution, and hence, does not function. This theory is offered as the most probable explanation for the failure of this class of materials to function. However, since other theories may be advanced, this particular theory is not to be construed as limiting.

TABLE I

*Dechlorination of trifluorotrichloroethane with zinc dust in water at 75° C.*

| Run No. | Material charged to tube | | | | | Time, hrs. | Product (grams) |
|---|---|---|---|---|---|---|---|
| | F-113 | H$_2$O | Zn | Substance | Amount | | |
| 1 | 75 | 50 | 51 | Acetic acid | 5 cc | 16 | 4.6 |
| 2 | 75 | 50 | 51 | Zinc chloride | 2 g | 16 | 30.1 |
| 3 | 75 | 50 | 51 | do | 10 g | 16 | 68.4 |
| 4 | 75 | 50 | 51 | Aquet * | 20 cc | 16 | 39.7 |
| 5 | 75 | 50 | 33.5 | None | | 9 | 53.8 |
| 6 | 75 | 50 | 33.5 | Potassium stearate | .25 g | 9 | 42.2 |
| 7 | 75 | 50 | 33.5 | do | .05 g | 9 | 48.8 |
| 8 | 75 | 50 | 33.5 | Aquet * | | 2.25 | 49.2 |
| 9 | 75 | 50 | 33.5 | do | 5 cc | 8 | 49.0 |
| 10 | 75 | 50 | 33.5 | do | 1 cc | 8 | 59.6 |
| 11 | 75 | 50 | 33.5 | NH$_4$OH | 5 cc | 8 | 50.3 |
| 12 | 75 | 50 | 33.5 | All | 1 g | 8 | 52.9 |

| Run No. | Product composition in mol percent | | | | | |
|---|---|---|---|---|---|---|
| | CF$_2$=CFCl | CF$_2$ClCCl$_2$F | CF$_2$ClCHFCl | CF$_2$=CHF | CF$_2$=CHCl | CF$_3$CHCl$_2$ |
| 1 | 85.0 | 6.3 | 5.6 | 2.4 | .6 | .1 |
| 2 | 79.8 | 10.1 | 7.3 | 2.0 | .7 | .1 |
| 3 | 70.4 | 21.0 | 4.6 | 3.1 | .7 | .2 |
| 4 | 90.8 | 6.6 | 1.5 | .6 | .4 | .1 |
| 5 | 86.6 | 3.7 | 5.0 | 4.1 | .6 | |
| 6 | 87.8 | 2.7 | 4.8 | 4.1 | .6 | .1 |
| 7 | 88.8 | 2.3 | 4.1 | 4.2 | .5 | |
| 8 | 84.2 | 6.3 | 5.1 | 3.7 | .6 | .05 |
| 9 | 93.7 | 2.7 | 1.5 | .8 | .5 | .05 |
| 10 | 91.3 | 4.2 | 3.1 | .7 | .6 | |
| 11 | 75.3 | 9.9 | 10.6 | 3.0 | .6 | |
| 12 | 90.2 | 5.2 | 1.9 | 1.2 | .6 | |

* 25% solution of nonyl phenol polyglycol ether.

TABLE II

*Effect of various additives on dechlorination of trifluorotrichloroethane with zinc dust in water at room temperature*

| Run No. | Material charged to tube | | | | | Time, hrs. | Product (grams) |
|---|---|---|---|---|---|---|---|
| | F-113, g. | H$_2$O, g. | Zn, g. | Substance | Amount | | |
| 1 | 78.2 | 50 | 33.5 | Ammonium hydroxide | 10 cc | 48 | 55.5 |
| 2 | 76.7 | 50 | 33.5 | Potassium stearate | 0.1 g | 48 | 51.2 |
| 3 | 78.2 | 50 | 33.5 | Ammonium acetate | 2.5 g | 48 | 56.3 |
| 4 | 79.7 | 50 | 33.5 | None | | 4 | |
| 5 | 74.7 | 50 | 33.5 | do | | 4 | 63.4 |
| 6 | 61.6 | 80 | 26.7 | do | | 4 | 47.2 |
| 7 | 77.6 | 50 | 33.5 | Zinc chloride | 50 g | 2 | 70.2 |
| 8 | 155.3 | 50 | 67 | Polyglygol ether stearate | .5 g | 2 | 131.3 |
| 9 | 83.3 | 75 | 33.5 | do | 1.5 g | 2 | 56.1 |
| 10 | 79.1 | 75 | 33.5 | do | .75 g | 2 | 60.9 |

| Run No. | Composition of product in mol percent | | | | | | Selectivity to monomer |
|---|---|---|---|---|---|---|---|
| | CF$_2$=CFCl | CF$_2$ClCCl$_2$F | CF$_2$ClCHFCl | CF$_2$=CHF | CF$_2$=CHCl | CF$_3$CHCl$_2$ | |
| 1 | 87.0 | 4.0 | 6.0 | 1.7 | .4 | .1 | 91.9 |
| 2 | 81.0 | 8.9 | 5.8 | 3.6 | .4 | .2 | 89.5 |
| 3 | 79.4 | 9.0 | 8.2 | 1.7 | .6 | | 88.9 |
| 4 | 64.3 | 20.8 | 11.9 | 1.7 | .4 | .1 | 82.6 |
| 5 | 29.0 | 64.6 | 5.0 | | .1 | .4 | 85.3 |
| 6 | 40.5 | 48.4 | 8.2 | .3 | .3 | .3 | 82.5 |
| 7 | 9.2 | 88.5 | .7 | .4 | .2 | .5 | 87.6 |
| 8 | 35.5 | 60.9 | 1.8 | .3 | .3 | .3 | 94.1 |
| 9 | 63.8 | 31.7 | 2.5 | .2 | .4 | .2 | 95.8 |
| 10 | 58.9 | 36.8 | 2.3 | .4 | .4 | .2 | 95.4 |

TABLE III

*Dechlorination of trifluorotrichloroethane in sealed tubes using zinc dust and methanol*

| Run No. | F contents of tube | | | Time, hrs. | Temp., °C. | Product (grams) |
|---|---|---|---|---|---|---|
| | F-113, g. | MeOH, cc. | Zinc, g. | | | |
| 1 | 44.4 | 50 | 20 | 2 | 30 | 29.2 |
| 2 | 36.3 | 40 | 16 | 1 | 25 | 22.6 |

| Run No. | Composition of product in mol percent | | | | | | Selectivity to monomer |
|---|---|---|---|---|---|---|---|
| | CF$_2$ClCFCl$_2$ | CF$_2$=CFCl | CF$_2$ClCHFCl | CF$_2$=CHF | CF$_2$=CHCl | CF$_2$CHCl$_2$ | |
| 1 | 0.9 | 91.8 | 6.7 | 0 | 0.3 | 0.3 | 93.6 |
| 2 | 10.5 | 84.6 | 4.3 | .3 | Trace | .3 | 94.9 |

TABLE IV

*Effect of detergent and temperature on rate and selectivity in dechlorination of trifluorotrichloroethane with zinc dust in water*

| Run No. | Material charged to tube | | | | Product, g. | Time, hrs. | Temp., °C. |
|---|---|---|---|---|---|---|---|
| | F-113, g. | H₂O, g. | Zn, g. | Detergent, g. | | | |
| 1 | 62.2 | 40 | 26.8 | 0.4 | 47.2 | 1 | 25 |
| 2 | 76.1 | 50 | 33.5 | .5 | 55.2 | 2 | 30 |
| 3 | 75.9 | 50 | 33.5 | .5 | 53.8 | 4 | 25 |
| 4 | 79.6 | 50 | 33.5 | .5 | 53.4 | 48 | 25 |
| 5 | 77.8 | 50 | 33.5 | .5 | 61.1 | 4 | 50 |
| 6 | 77.5 | 50 | 33.5 | 0 | 41.7 | 12 | 50 |
| 7 | 76.6 | 50 | 33.5 | 0 | 45.5 | 24 | 50 |
| 8 | 75.9 | 50 | 33.5 | 0 | 60.3 | .5 | 75 |
| 9 | 76.2 | 50 | 33.5 | .5 | 62.9 | 1 | 75 |
| 10 | 76.6 | 50 | 33.5 | .5 | 55.3 | 2 | 75 |
| 11 | 77.4 | 50 | 33.5 | .5 | 52.7 | 4 | 75 |
| 12 | 75.2 | 50 | 33.5 | .5 | 52.1 | 8 | 75 |
| 13 | 76.3 | 50 | 33.5 | 0 | 45.0 | 5 | 90 |

| Run No. | Composition of product in mol percent | | | | | | Selec. to Monomer |
|---|---|---|---|---|---|---|---|
| | $CF_2=CFCl$ | $CF_2ClCCl_2F$ | $CF_2ClCHFCl$ | $CF_2=CHF$ | $CF_2=CHCl$ | $CF_2CHCl_2$ | |
| 1 | 43.3 | 48.8 | 2.0 | 0.4 | 0.3 | 0.4 | 94.4 |
| 2 | 52.1 | 36.7 | 2.2 | .2 | .4 | .3 | 95.2 |
| 3 | 63.6 | 32.0 | 2.5 | .4 | .4 | .2 | 95.5 |
| 4 | 89.0 | 7.5 | 2.0 | .5 | .5 | .1 | 97.1 |
| 5 | 78.9 | 13.4 | 4.1 | 2.0 | .9 | .1 | 92.3 |
| 6 | 81.1 | 8.6 | 6.1 | 2.9 | .6 | .1 | 89.8 |
| 7 | 87.6 | 3.5 | 4.7 | 3.5 | .6 | .1 | 91.3 |
| 8 | 26.2 | 34.8 | 1.7 | .2 | .3 | .1 | 93.6 |
| 9 | 58.8 | 37.1 | 1.8 | .6 | .6 | .2 | 95.6 |
| 10 | 71.9 | 23.5 | 2.5 | .7 | .6 | 0 | 95.6 |
| 11 | 81.3 | 13.4 | 2.8 | .9 | .6 | 0 | 95.5 |
| 12 | 87.7 | 7.8 | 2.4 | 1.0 | .7 | 0 | 96.0 |
| 13 | 86.0 | 4.1 | 5.1 | 4.1 | .6 | .1 | 90.1 |

TABLE V

*Selectivity of products from dechlorination of trifluorotrichloroethane with zinc dust, an equal volume of water and various detergents at 25–30° C. for two hours*

| Run No. | Detergent | | Freon-113 converted, mol percent | Select. monomer, mol percent |
|---|---|---|---|---|
| | Name | Weight Percent | | |
| 1 | Polyglycol ether stearate | 0.5 | 53.4 | 93.0 |
| 2 | do | 1.0 | 59.8 | 95.2 |
| 3 | do | 2.0 | 66.4 | 95.4 |
| 4 | Potassium stearate | .5 | 26.1 | 81.8 |
| 5 | do | 2.0 | 6.0 | 76.7 |
| 6 | Sodium lauryl sulfate | 1.0 | 74.0 | 91.7 |
| 7 | do | 2.0 | 95.9 | 95.0 |
| 8 | Sodium dodecylbenzene sulfonate | .5 | 86.3 | 94.8 |
| 9 | do | 1.0 | 81.9 | 94.7 |
| 10 | Sodium isopropylnaphthalene sulfonate | 1.0 | 50.9 | 92.3 |
| 11 | Sulfonated aliphatic polyester | 1.0 | 73.4 | 96.1 |
| 12 | Stearyl dimethyl benzyl ammonium chloride | 1.0 | 53.3 | 95.7 |
| 13 | Dimethyl octynediol | 1.0 | 46.1 | 92.5 |
| 14 | do | | 24.8 | 80.0 |
| 15 | do | | 24.2 | 78.7 |

| Run No. | Composition of product in mol percent | | | | | |
|---|---|---|---|---|---|---|
| | $CF_2=CFCl$ | $CF_2ClCCl_2F$ | $CF_2ClCHFCl$ | $CF_2=CHF$ | $CF_2=CHCl$ | $CF_2CHCl_2$ |
| 1 | 49.4 | 46.4 | 3.4 | 0.2 | 0.5 | 0.1 |
| 2 | 52.1 | 36.7 | 2.2 | .2 | .4 | .3 |
| 3 | 62.3 | 33.2 | 2.5 | .4 | .5 | .2 |
| 4 | 21.1 | 73.1 | 4.0 | .5 | .1 | .6 |
| 5 | 4.6 | 93.5 | 1.0 | .2 | .1 | .6 |
| 6 | 65.7 | 25.3 | 3.1 | 2.8 | .3 | .4 |
| 7 | 90.6 | 4.1 | 1.6 | 3.2 | .4 | .1 |
| 8 | 80.9 | 14.1 | 2.9 | 1.5 | .3 | .3 |
| 9 | 76.5 | 17.9 | 2.6 | 1.6 | .3 | .3 |
| 10 | 46.3 | 48.5 | 2.6 | 1.1 | .2 | .5 |
| 11 | 69.6 | 26.2 | 1.5 | 1.1 | .5 | .2 |
| 12 | 50.1 | 45.9 | 1.8 | .3 | .2 | .4 |
| 13 | 40.4 | 51.1 | 2.7 | .5 | .3 | .3 |
| 14 | 19.6 | 74.4 | 4.5 | .3 | .2 | .4 |
| 15 | 18.5 | 73.8 | 4.2 | .7 | .2 | .4 |

As indicated previously, the process of this invention is applicable to the dehalogenation of a wide variety of starting materials to produce useful end products. In order to illustrate the wide utility of this process, the following examples are presented in which parts are by weight.

EXAMPLE I

This example illustrates the dechlorination of 1,1,2-trifluoro-1,2-dichloroethane (Freon 123 B). Using the technique which was employed in the runs described in the foregoing tables, 43.3 grams of 1,1,2-trifluoro-1,2-dichloroethane (Freon 123 B), 60 grams of water, 24 grams of zinc, 0.6 gram of stannous chloride and 0.6 gram of polyglycol ether stearate were sealed in a glass tube. The tube was maintained at a temperature of about 90° C. for about 16 hours after which the tube was vented and the contents analyzed. Analysis showed the following composition which is given in mol percent.

| Recovered | Mol percent |
| --- | --- |
| Trifluoroethylene | 42.9 |
| Trifludrochlorodethane (believed to be CF$_2$ClCH$_2$F) | .2 |
| 1,1,2-trifluoro-1,2-dichloroethane | 56.7 |
| 1,1-difluoro-2-chloroethylene | .2 |

In this reaction, conversion was 43.3 percent and the selectivity was 96.8 percent.

EXAMPLE II

This example illustrates the dechlorination of sym. dichlorotetrafluoroethane to produce tetrafluoroethylene. Using the previously described technique, 45 grams of sym. dichlorotetrafluoroethane (contaminated with a trace of the unsymmetrical isomer), 60 grams of water, 22.5 grams of zinc dust, 1.2 grams of polyglycol ether stearate and 1.8 grams of stannous chloride were sealed in a glass tube. The tube and contents were heated with agitation at 90° C. for 14 hours after which the tube was vented and the contents analyzed. Analysis showed 30 mol percent of tetrafluoroethylene, approximately 70 mol percent of sym. dichlorotetrafluoroethane and a trace of unsymmetrical isomer. The conversion was 30 percent and the selectivity 100 percent.

EXAMPLE III

This example illustrates the dechlorination of 1,1-difluoro-1,2-dichloroethane to produce vinylidene fluoride. In this reaction the technique described above is used. Thus, 45 grams of 1,1-difluoro-1,2-dichloroethane, 60 grams of water, 25 grams of zinc, 0.5 gram of stannous chloride and 0.7 gram of polyglycol ether stearate are sealed in a glass tube. The tube and contents are maintained at a temperature of about 50° C. for about 9 hours after which the tube is vented and the products distilled. A high selectivity to vinylidene fluoride is obtained.

The following examples are intended to illustrate the defluorochlorination reaction which can be conducted using the process of this invention.

EXAMPLE IV

This example illustrates the dehalogenation of a mixture of starting compounds in which one compound is defluoroinated and the other is defluorochlorinated. Approximately 70.8 grams of a mixture containing 78.8 mol percent of 1,1,2-trifluorotrichloroethane (Freon 113), 20.1 mol percent of 1,1,1-trifluoro-2,2-dichloroethane (Freon 123), 0.1 mol percent of 1,1,2-trifluoro-1,2-dichloroethane (Freon 123-B) and 1 mol percent of dichlorotetrafluoroethane (Freon 114 or 114-A), 50 grams of water, 33 grams of zinc and 0.5 grams of polyglycol ether stearate (All) were sealed in a glass tube. The tube and contents were maintained at a temperature of about 28° for about 4 hours after which the tube was vented and the contents analyzed using a mass spectrometer. The analysis showed the following:

| Recovered | Mol percent |
| --- | --- |
| Trifluorochloroethylene | 70.2 |
| 1,1-difluoro-2-chloroethylene | 16.8 |
| 1,1,2-trifluorotrichloroethane | 6.1 |
| 1,1,2-trifluoro-1,2-dichloroethane | 2.8 |
| 1,1,1-trifluoro-2,2-dichloroethane | 1.6 |
| Dichlorotetrafluoroethane | 0.9 |
| Trifluorochloroethane (believed to be the 1,1,1-trifluoro compound) | 1.6 |

EXAMPLE V

This example illustrates the defluorochlorination of 1,1,1-trifluoro-2,2-dichloroethane to produce 1,1-difluoro-2-chloroethylene. In this reaction the technique described above is used.

50 grams of water, 75 grams of 1,1,1-trifluoro-2,2-dichloroethane (Freon 123), 39 grams of zinc dust and 0.5 gram of polyglycol ether stearate (All) are charged to a sealed glass reaction vessel and the contents agitated vigorously for 4 hours at room temperature. The contents are then vented and 50 grams of fluorocarbon product obtained. The following products are recovered:

| Recovered | Mol percent |
| --- | --- |
| 1,1,1-trifluoro-2,2-dichloroethane | 8 |
| 1,1-difluorochloroethylene | 84 |
| 1,1,1-trifluorochloroethane | 8 |

In the above examples and tables of data, the use of compounds, such as stannous chloride, in conjunction with the detergents of this invention are shown. Compounds such as this, are usually added to reduce the induction period, that is, to shorten the time in which the reaction starts up. As indicated in many of the tables, the detergents of this invention can be employed without such initiators. However, their use in some instances may be of an advantage. Representative of such compounds are stannous chloride, zinc chloride and other metal chlorides.

Various modifications and alterations of the process of this invention will become apparent to those skilled in the art and may be used without departing from the scope of this invention.

We claim:

1. A process for dehalogenating a halogen-containing organic compound which comprises dehalogenating a dehalogenatable fluorine-containing alkane which contains at least one halogen of the group consisting of fluorine and chlorine on a carbon atom and at least one chlorine atom on an adjacent carbon atom and in which all other substituents are selected from the group consisting of alkyl, aryl, halogen and hydrogen substituents with a metal dehalogenating agent in the presence of water containing a detergent which does not react with the halide of the metal dehalogenating agent to form a water insoluble compound.

2. The process of claim 1 in which the detergent is a non-ionic detergent.

3. The process of claim 2 in which the non-ionic detergent is polyglycol ether stearate.

4. The process of claim 2 in which the non-ionic detergent is the polyethylene glycol ether of p-nonyl phenol.

5. The process of claim 1 in which the detergent is an anionic detergent which does not react with the halide of the metal dehalogenating agent to form a water insoluble compound.

6. The process of claim 5 in which the anionic detergent is sodium dodecylbenzene sulfonate.

7. The process of claim 5 in which the anionic detergent is sodium lauryl sulfate.

8. The process of claim 1 in which the detergent is a cationic detergent.

9. The process of claim 8 in which the cationic detergent is stearyl dimethyl benzyl ammonium chloride.

10. A process for the production of trifluoroethylene which comprises reacting 1,1,2-trifluoro-1,2-dichloroethane with metallic zinc in the presence of water containing between about 0.1 and about 5 percent by weight of a detergent which does not react with zinc chloride to form a water insoluble compound at a temperature between about 0° C. and about 100° C.

11. A process for the production of tetrafluoroethylene which comprises reacting sym. dichlorotetrafluoroethane with metallic zinc in the presence of water containing between about 0.1 and about 5 percent by weight of a detergent which does not react with zinc chloride to form a water insoluble compound at a temperature between about 0° C. and about 100° C.

12. A process for the production of vinylidene fluoride which comprises reacting 1,1-difluoro-1,2-dichloroethane with metallic zinc in the presence of water containing between about 0.1 and about 5 percent by weight of a detergent which does not react with zinc chloride to form a water insoluble compound at a temperature between about 0° C. and about 100° C.

13. A process for the production of trifluorochloroethylene which comprises reacting 1,1,2-trifluorotrichloroethane with metallic zinc in the presence of water containing between about 0.1 and about 5 percent by weight of a detergent which does not react with zinc chloride to form a water insoluble compound at a temperature between about 0° C. and about 100° C.

14. A process for producing 1,1-difluoro-2-chloroethylene which comprises reacting 1,1,1-trifluoro-2,2-dichloroethane with metallic zinc in the presence of water containing between about 0.1 and about 5 percent by weight of a detergent which does not react with zinc halide to form a water insoluble compound at a temperature between about 0° C. and about 100° C.

15. A process for producing fluorine-containing olefins which comprises reacting a fluorochloroalkane containing at least one halogen of the group consisting of fluorine and chlorine on a carbon atom and at least one chlorine atom on an adjacent carbon atom with a metal dehalogenating agent in the presence of water containing between about 0.1 and about 10 percent by weight of a detergent which does not react with the halide of the metal dehalogenating agent to form a water insoluble compound.

16. A process for producing fluorine-containing olefins which comprises reacting a fluorochloroalkane containing at least one halogen of the group consisting of fluorine and chlorine on a carbon atom and at least one chlorine atom on an adjacent carbon atom with a metal dehalogenating agent in the presence of water in a ratio of water to monomer between about 1:5 and about 10:1, said water containing between about 0.1 and about 10 percent by weight of a detergent which does not react with the halide of the metal dehalogenating agent to form a water insoluble compound at a temperature between about 15° C. and about 90° C.

17. A process for producing fluorine-containing olefins which comprises reacting a fluorochloroalkane of from 2 to 3 carbon atoms containing at least one halogen of the group consisting of fluorine and chlorine on a carbon atom and at least one chlorine atom on an adjacent carbon atom with a metal dehalogenating agent in the presence of water in a ratio of water to monomer between about 1:5 and about 10:1, said water containing between about 0.1 and about 10 percent by weight of a detergent which does not react with the halide of the metal dehalogenating agent to form a water insoluble compound at a temperature between about 15° C. and about 90° C.

18. A process for producing fluorine-containing olefins which comprises reacting a fluorochloroethane containing at least one halogen of the group consisting of fluorine and chlorine on a carbon atom and at least one chlorine atom on an adjacent carbon atom with a metal dehalogenating agent in the presence of water in a ratio of water to monomer between about 1:5 and about 10:1, said water containing between about 0.1 and about 10 percent by weight of a detergent which does not react with the halide of the metal dehalogenating agent to form a water insoluble compound at a temperature between about 15° C. and about 90° C.

References Cited in the file of this patent

UNITED STATES PATENTS

| | | |
|---|---|---|
| 2,635,121 | Smith et al. | Apr. 14, 1953 |
| 2,691,036 | Miller | Oct. 5, 1954 |

FOREIGN PATENTS

| | | |
|---|---|---|
| 993,097 | France | July 18, 1951 |

UNITED STATES PATENT OFFICE

CERTIFICATE OF CORRECTION

Patent No. 2,774,798                                                        December 18, 1956

Horace R. Davis et al.

It is hereby certified that error appears in the printed specification of the above numbered patent requiring correction and that the said Letters Patent should read as corrected below.

Column 2, line 47, for "halogenating" read -- dehalogenating --; columns 7 and 8, Table V, second column thereof, opposite Runs 14 and 15, for "do", each occurrence, read -- None --.

Signed and sealed this 23rd day of April 1957.

(SEAL)
Attest:

KARL H. AXLINE

Attesting Officer

ROBERT C. WATSON
Commissioner of Patents